(12) United States Patent
Tokushima (10) Patent No.: US 8,705,920 B2
(45) Date of Patent: Apr. 22, 2014

(54) WAVELENGTH FILTER (75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 224 days.

(21) Appl. No.: 13/141,450

(22) PCT Filed: Dec. 25, 2009

(86) PCT No.: PCT/JP2009/007264
§ 371 (c)(1),
(2), (4) Date: Jun. 22, 2011

(87) PCT Pub. No.: WO2010/073708
PCT Pub. Date: Jul. 1, 2010

(65) Prior Publication Data
US 2011/0293217 A1    Dec. 1, 2011

(30) Foreign Application Priority Data

Dec. 26, 2008   (JP) ................................ P2008-332421

(51) Int. Cl.
*G02B 6/26* (2006.01)
(52) U.S. Cl.
USPC .............................................. 385/50; 385/27
(58) Field of Classification Search
None
See application file for complete search history.

(56) References Cited

U.S. PATENT DOCUMENTS

2003/0161565 A1* 8/2003 Bastian .............................. 385/3
2008/0002931 A1* 1/2008 Noda et al. ...................... 385/16

FOREIGN PATENT DOCUMENTS

| JP | 54-141654 A | 11/1979 |
| JP | 8-330671 A | 12/1996 |
| JP | 2002504705 A | 2/2002 |
| JP | 2002504712 A | 2/2002 |
| JP | 2002510400 A | 4/2002 |
| JP | 2002303836 A | 10/2002 |
| JP | 2004212416 A | 7/2004 |
| JP | 2004295113 A | 10/2004 |
| WO | 2004053549 A | 6/2004 |
| WO | 2005093481 A | 10/2005 |
| WO | 2006070868 A | 7/2006 |
| WO | 2006073194 A | 7/2006 |

OTHER PUBLICATIONS

E. H. Khoo et al., "Six Port Waveguide Filter Based on Circular Photonic Crystal", 2008 IEEE/LEOS International Conference on Optical MEMs and Nanophotonics, 2008, pp. 166-167.
T. Fujisawa et al., "Finite-Element Modeling of Nonlinear Mach-Zehnder Interferometers Based on Photonic-Crystal Waveguides for All-Optical Signal Processing", Journal of Lightwave Technology, vol. 24, No. 1, Jan. 2006, pp. 617-623.

(Continued)

*Primary Examiner* — Jerry Rahll
(74) *Attorney, Agent, or Firm* — Sughrue Mion, PLLC (57) ABSTRACT

A wavelength filter includes a first waveguide with a transmission band of a predetermined basic mode and a second waveguide, arranged in at least one location of the first waveguide, with a transmission band whose cutoff frequency corresponds to a finite value included in the transmission band of the basic mode. A pair of optical couplers constituting a Mach-Zehnder interferometer is connected to the opposite ends of a filter unit including the first waveguide and the second waveguide. When a plurality of wavelength filters is cascaded, the wavelength filters can be each varied in terms of the cutoff frequency of the second waveguide.

6 Claims, 11 Drawing Sheets

(56) References Cited

OTHER PUBLICATIONS

M. Tokushima et al., "1.5-µm-wavelength light guiding in waveguides in square-lattice-of-rod photonic crystal slab", Applied Physics Letters, vol. 84, No. 21, May 24, 2004, pp. 4298-4300.

M. Tokushima et al., "Efficient transmission mechanisms for waveguides with 90° bends in pillar photonic crystals" Journal of the Optical Society of America B, vol. 22, No. 11, Nov. 2005, pp. 2472-2479.

Masatoshi Tokushima, "Ultra-Compact Pillar-Photonic-Crystal-Based Tunable Mach-Zehnder Interferometer", 2008 Proceedings of the Society Conference of IEICE, The Institute of Electronics, Information and Communication Engineers, C-3-84, Sep. 2, 2008, pp. 206.

Masatoshi Tokushima et al., "Light transmission in a line-defect waveguide in a square-lattice-of-rod photonic-crystal slab", Godo Seika Hokoku Symposium, Apr. 19-20, 2004, pp. 75-78.

Written Opinion of the International Searching Authority PCT/ISA/237 for PCT Application No. PCT/JP2009/007264, mailed on Feb. 23, 2010.

Akiko Gomyo et al., "OADM using mode gap with hexagonal-hole lattic PC slab waveguides (2)", 2006, The 53rd Spring Meeting, Japan Society of Applied Physics and Related Societies, separate vol. 3, Mar. 22, 2006, 23a-L-2.

Akiko Gomyo et al., "Optical filter using line-defect waveguide-mode gap with rod-type square-lattice photonic crystal slab" 2006, The 53rd Spring Meeting, Japan Society of Applied Physics and Related Societies, separate vol. 3, Mar. 22, 2006, 22p-L-10.

Masayoshi Tokushima, "Ultra-Compact Pillar-Photonic-Crystal-Based Tunable Mach-Zehnder Interferometer", 2008 Proceedings of the Society Conference of IEICE, The Institute of Electronics, Information and Communication Engineers, C-3-84, Sep. 2, 2008, pp. 206.

Masatoshi Tokushima et al., "Light transmission in a line-defect waveguide in a square-lattice-of-rod photonic-crystal slab", Godo Seika Shinkoku Symposium, Apr. 19-20, 2004, pp. 75-78.

International Search Report for PCT Application No. PCT/JP2009/007264 mailed on Feb. 23, 2010.

Written Opinion of the International Searching Authority PCT/ISA/237 for PCT Application No. PCT/JP2009/007264, dated on Feb. 10, 2010.

* cited by examiner

WAVELENGTH FILTER

TECHNICAL FIELD

This invention relates to wavelength filters having photonic crystal structures transmitting optical signals with predetermined frequency bands.

This application is the National Phase of PCT/JP2009/007264, filed Dec. 25, 2009, which claims priority on Japanese Patent Application No. 2008-332421 filed on Dec. 26, 2008, the entire content of which is incorporated herein by reference.

BACKGROUND ART

Technologies regarding optical integrated circuits, in which optical components are integrated together, such as transistor integrated circuits integrating electronic components, have been developed. At present, optical circuits are composed of optical components such as optical switches, wavelength filters, 3 dB couplers (optical couplers), which are connected together via optical waveguides such as optical fibers, wherein it is possible to significantly reduce volumes of optical circuits, power consumption, and manufacturing cost if a plurality of optical components is integrated into a small chip. Until now, various technologies regarding optical integrated circuits have been developed, wherein Japanese Patent Application Publication No. 2002-303836, for example, discloses an optical switch having a photonic crystal structure. Photonic crystals (or "photonic crystalline") is a general term regarding the structure undergoing periodical variations of refractive indexes of light.

Photonic crystals demonstrate various special features of optics owing to periodically structured refractive-index profiles, wherein one exemplary feature is a photonic band gap (PBG). Photonic crystals are able to transmit light therethrough, but they do not transmit light of a specific frequency band when photonic crystals undergo significantly large periodical variations of refractive indexes. The frequency bands (or wavelength ranges) of light transmitted through photonic crystals are called photonic bands. The frequency bands of light not transmitted through photonic crystals are called photonic band gaps (PBG) since they emerge in gaps between photonic bands. In some structure of photonic crystals, photonic band gaps overlap with a plurality of frequency bands. Photonic bands which are split via photonic band gaps are called a first band, a second band, and a third band aligned in ascending order of frequency.

When photonic crystals develop micro defects destroying periodically structured refractive-index profiles (or periodicity of refractive indexes), light having frequencies of photonic band gaps are confined in micro defects. In this case, light whose frequency depends on the sizes of micro defects are solely confined in micro defects; hence, those photonic crystals serve as resonators. For this reason, photonic crystals can be used as frequency selective (wavelength selective) filters (or optical filters).

When a plurality of micro defects is consecutively developed in lines so as to form line defects in photonic crystals, light having frequencies of photonic band gaps is confined in line detects, so that light may propagate along line defects. That is, photonic crystals containing line defects can be used for optical waveguides. Optical waveguides composed of photonic crystals containing line defects are called line-defect waveguides.

It is possible to constitute optical functional elements such as optical modulators and optical switches by using either optical filters or optical waveguides or by combining both of them. That is, it is possible to constitute optical circuits by forming and connecting optical functional elements in photonic crystals. For this reason, it is expected that photonic crystals contribute to the platform of optical integrated circuits.

In actuality, the following limitations are applied to photonic crystal structures, which are expected to serve as the platform of optical integrated circuits.

To utilize effects of photonic band gaps in a three-dimensional manner consisting of X-axis, Y-axis and Z-axis, refractive-index profiles of photonic crystals need to be periodically structured in a three-dimensional manner. Since three-dimensionally structured refractive-index profiles are complex and entail high manufacturing cost, two-dimensionally structured refractive-index profiles have been frequently used in photonic crystals (hereinafter, referred to as photonic crystals). Actually utilized two-dimensional photonic crystals are formed in substrates with finite thicknesses, wherein refractive-index profiles indicate periodicity in a plane, but refractive-index profiles do not indicate periodicity in the thickness direction of substrates. In this case, it is hard to achieve optical confinement in the thickness direction of substrates based on the PBG effect, but it is possible to achieve such optical confinement based on the total reflection owing to refractive-index differences.

Optical features of two-dimensional photonic crystals with finite thicknesses do not perfectly match with optical features of two-dimensional photonic crystals with infinite thicknesses. When refractive-index profiles of two-dimensional photonic crystals with finite thicknesses are created with symmetry of reflection in the thickness direction in light propagating regions, their optical features approximately match with optical features of two-dimensional photonic crystals with infinite thicknesses. The operational prediction of two-dimensional photonic crystals with infinite thicknesses is by far easier than the operational prediction of two-dimensional photonic crystals with finite thicknesses. For this reason, it is possible to easily design devices using two-dimensional photonic crystals demonstrating refractive-index profiles with symmetry of reflection At present, various structures have been developed with respect to two-dimensional photonic crystals with finite thicknesses. For instance, pillar-type tetragonal photonic crystals demonstrate features (i.e. low group-velocity characteristics) in which the speed of light propagating through line-defect waveguides decreases in a broad range of frequency bands. Generally speaking, it is possible to constitute optical circuits of predetermined functions with short waveguide lengths by using waveguides which in turn decrease light propagating speeds. Therefore, line-defect waveguides composed of pillar-type tetragonal photonic crystals are suitable to optical integrated circuits.

Figure 12:
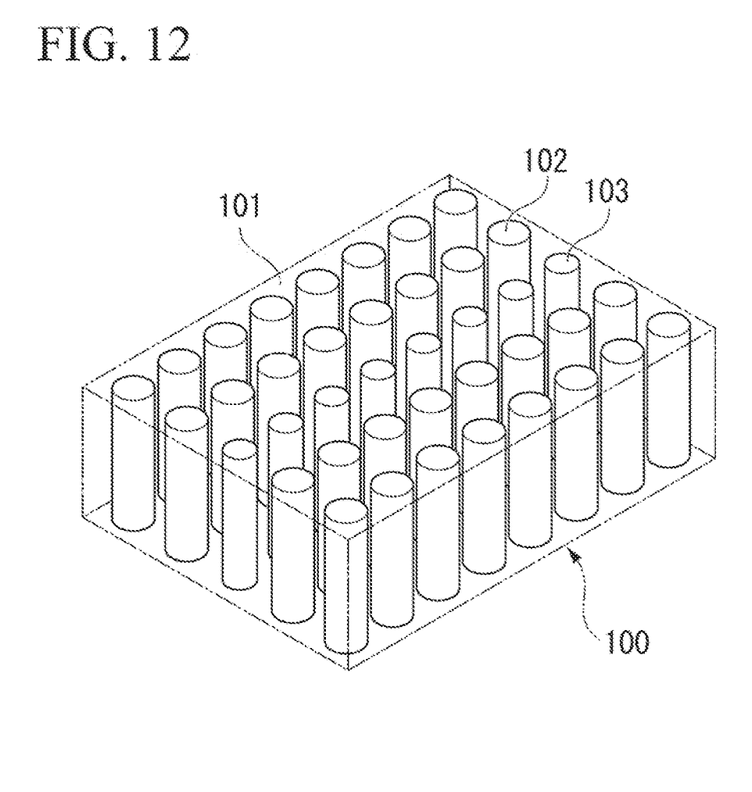
FIG. 12 A perspective view showing the structure of a line-defect waveguide composed of pillar-type tetragonal photonic crystals having a finite thickness.

FIG. 12 is a perspective view showing the structure of a line-defect waveguide composed of a pillar-type tetragonal photonic crystal 100 with a finite thickness. The pillar-type tetragonal photonic crystal 100 is composed of a low dielectric material 101, which arrange cylinders 102, each having a finite height and composed of a high dielectric material, and cylinders 103 whose diameters are smaller than those of cylinders 102 in a tetragonal lattice array. The name "photonic crystals" derives from the fact that the tetragonal lattice array for arranging the cylinders 102 and 103 is likened to the lattice array of atoms in silicones and crystals and available to optical applications. In this connection, the low dielectric material 101 and the cylinders 102, 103 are not necessarily composed of crystalline-structured materials but can be composed of amorphous-structured materials.

In FIG. 12, the cylinders 102 are cylinders composed of photonic crystals with perfect periodicity, whilst the cylinders 103 are smaller than the cylinders 102 in diameter; hence, the cylinders 103 can be regarded as defects occurring in perfect crystals. The following description distinguishes between the cylinders 102 composed of perfect crystals and the cylinders 103 serving as defects, wherein the former one will be referred to as "non-line-defect cylinders" and the latter one as "line-defect cylinders". Herein, it is noted that the line-defect cylinders 103 do not cause defects by itself.

The pillar-type tetragonal photonic crystal 100 linearly arranges the line-defect cylinders 103 therein, thus forming line-defect waveguides using the linear arrangement of the line-defect cylinders 103 and their surrounding non-line-defect cylinders 102. In the line-defect waveguide composed of the pillar-type tetragonal photonic crystal 100, the linear arrangement of the line-defect cylinders 103 is deemed equivalent to the core of a total-reflection confinement waveguide such as an optical fiber, while an array of the non-line-defect cylinders 102 on opposite sides as well as the surrounding low dielectric material 101 is deemed equivalent to the clad. Similar to the total-reflection confinement waveguide which implements a waveguide function with the core and the clad, the line-defect waveguide implements a waveguide function with the line-defect cylinders 103 and the surrounding non-line-defect cylinders 102 as well as the low dielectric material 101. The line-defect waveguide may serve as a single-mode waveguide solely indicating a basic mode when it is appropriately designed and manufactured.

As described above, wavelength filters can be constituted using photonic crystals with micro defects formed therein. In actuality, however, wavelength filters need to be accompanied with structures for inputting/outputting light. For instance, wavelength filters can be constituted by arranging line-defect waveguides proximate to micro resonators as disclosed in Japanese Patent Application Publication No. 2004-295113 or by partially inserting micro resonators into line-defect waveguides.

DISCLOSURE OF INVENTION

Problem to be Solved by the Invention

Generally speaking, wavelength filters including micro resonators indicate Lorentz transmission property, which adversely suffers from a problem due to small transmission bandwidths which are equivalent to the full width at half maximum. For this reason, a flattop approach, pursuing broadband transmission property, has been adopted by operating a plurality of micro resonators, each having the same structure, which are joined together and optically coupled together. It is possible to constitute wavelength filters with broadband transmission/reflection property by use of micro resonators, whereas when wavelength filters are significantly improved in terms of broadband transmission property by use of micro resonators, it is necessary to increase the number of micro resonators coupled together, thus enlarging the overall sizes of wavelength filters.

This invention is made in light of the foregoing circumstances, wherein the object thereof is to provide a wavelength filter which is composed of a photonic crystal structure and which is able to secure a broadband transmission/reflection property.

Means for Solving the Problem

A wavelength filer of this invention includes a first waveguide with a transmission band of a predetermined basic mode, and a second waveguide, which is arranged in at least one location of the first waveguide, with a transmission band whose cutoff frequency corresponds to a finite value included in the transmission band of the basic mode. Additionally, a pair of optical couplers constituting a Mach-Zehnder interferometer is connected to the opposite ends of a filter unit including the first waveguide and the second waveguide.

When a plurality of wavelength filers is cascaded, the wavelength filters can be each varied in terms of the cutoff frequency of the second waveguide.

Effect of the Invention

This invention achieves broadband optical filtering, at the boundary of the cutoff frequency, with a simple structure by transmitting or reflecting light, transmitted through the first waveguide, at the boundary of the cutoff frequency (or cutoff wavelength) of the second waveguide in the filter unit of the wavelength filer. Additionally, it is possible to secure broad optical transmission/reflection bands without enlarging the structure.

MODE FOR CARRYING OUT THE INVENTION

Embodiment 1

Figure 1:
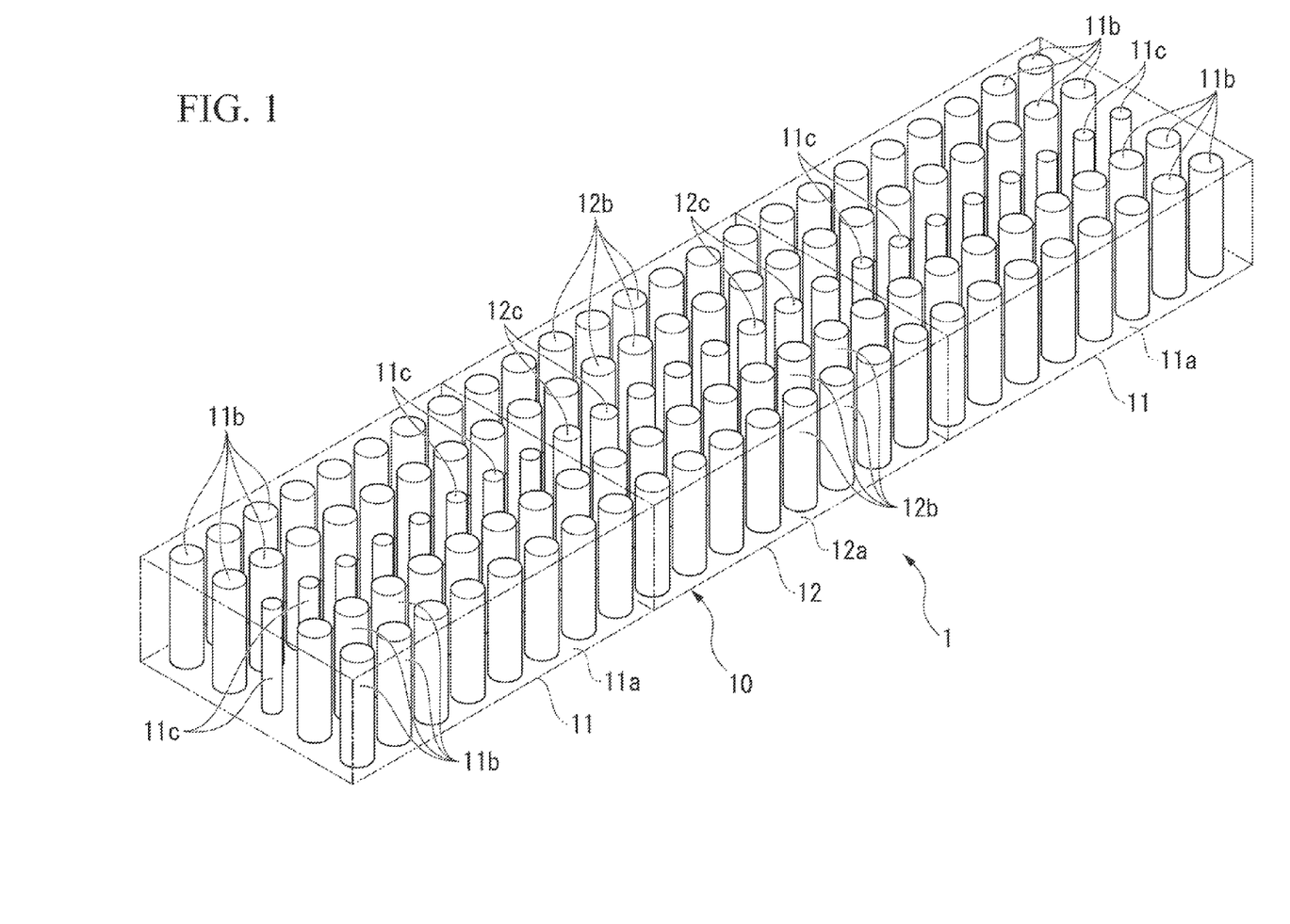
FIG. 1 A perspective view of a wavelength filter according to Embodiment 1 of this invention.

A wavelength filter 1 according to Embodiment 1 of this invention will be described with reference to FIGS. 1, 2, 3 and FIG. 4(a), (b). As shown in FIG. 1, the wavelength filter 1 contains a filter unit 10 which is constituted of first waveguides 11 each indicating a transmission band of a basic mode and a second waveguide 12 located in at least one part of the path of the first waveguides 11. The second waveguide 12 has a basic-mode transmission band whose cutoff wavelength matches a finite value included in the basic-mode transmission band of the first waveguide 11.

In Embodiment 1 , both the first waveguide 11 and the second waveguide 12 are photonic crystal waveguides, i.e. pillar-type tetragonal photonic crystal waveguides. The first waveguide 11 is constituted of a substrate 11a composed of low dielectric material, non-line-defect cylinders 11b and line-defect cylinders 11c , which are both composed of high dielectric material whose dielectric constant is higher than that of the substrate 11a and which are formed in cylindrical shapes and arranged in lines. Similarly, the second waveguide 12 is constituted of a substrate 12a composed of low dielectric material, non-line-defect cylinders 12b and line-defect cylinders 12c , which are both composed of high dielectric material whose dielectric constant is higher than that of the substrate 12a and which are formed in cylindrical shapes and arranged in lines. These non-line-defect cylinders and line-defect cylinders have already been discussed above.

Figure 2:
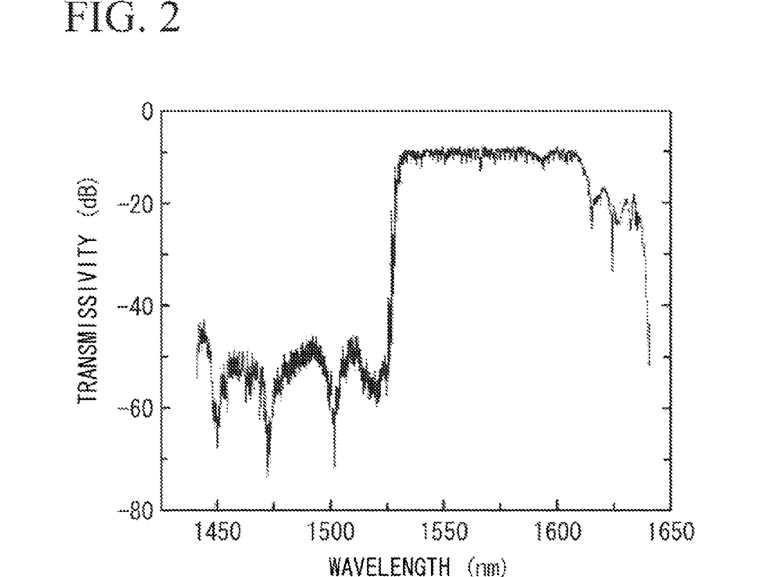
FIG. 2 A graph showing transmission spectrum of a line-defect waveguide composed of pillar-type tetragonal photonic crystals.
Figure 3:
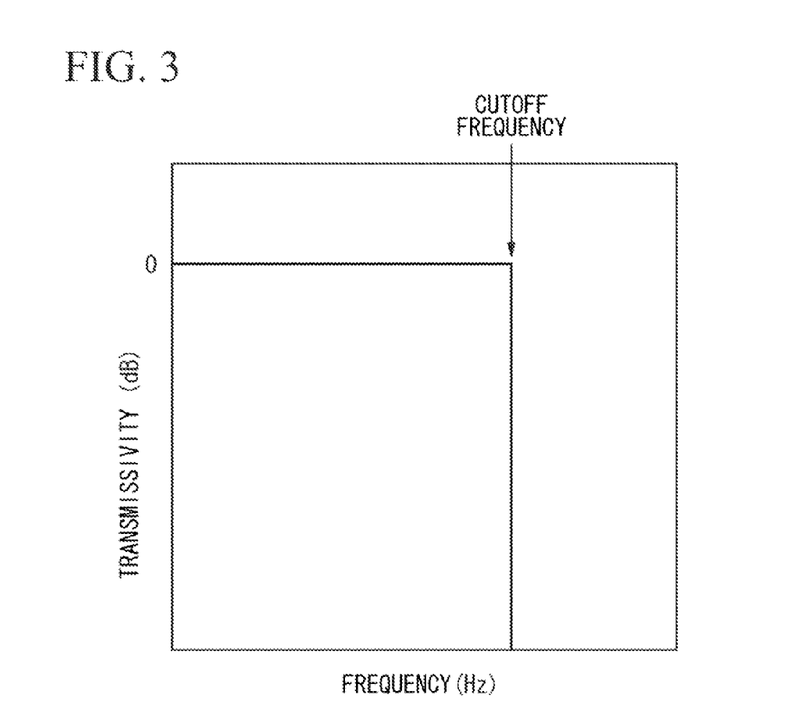
FIG. 3 A graph showing transmission spectrum corresponding to low-pass filtering characteristics.

FIG. 2 is a graph showing an example of transmission spectrum which was actually measured with respect to a line-defect waveguide composed of a pillar-type tetragonal photonic crystal, wherein the horizontal axis represents wavelength, and the vertical axis represents transmissivity. The wavelength of transmission band of this waveguide ranges from 1,525 to 1,605 nm, wherein the cutoff frequency in the short wavelength side (or the high frequency side) reads 1,525 nm. When the wavelength of an incident light ranges from 1,450 to 1,570 nm, for example, the foregoing waveguide serves as a low-pass filter which transmits light with a smaller wavelength (or a larger wavelength) than the cutoff wavelength. FIG. 3 is a graph showing transmission spectrum indicating low-pass filtering characteristic, wherein the horizontal axis represents frequency, and the vertical axis represents transmissivity.

Figure 4:
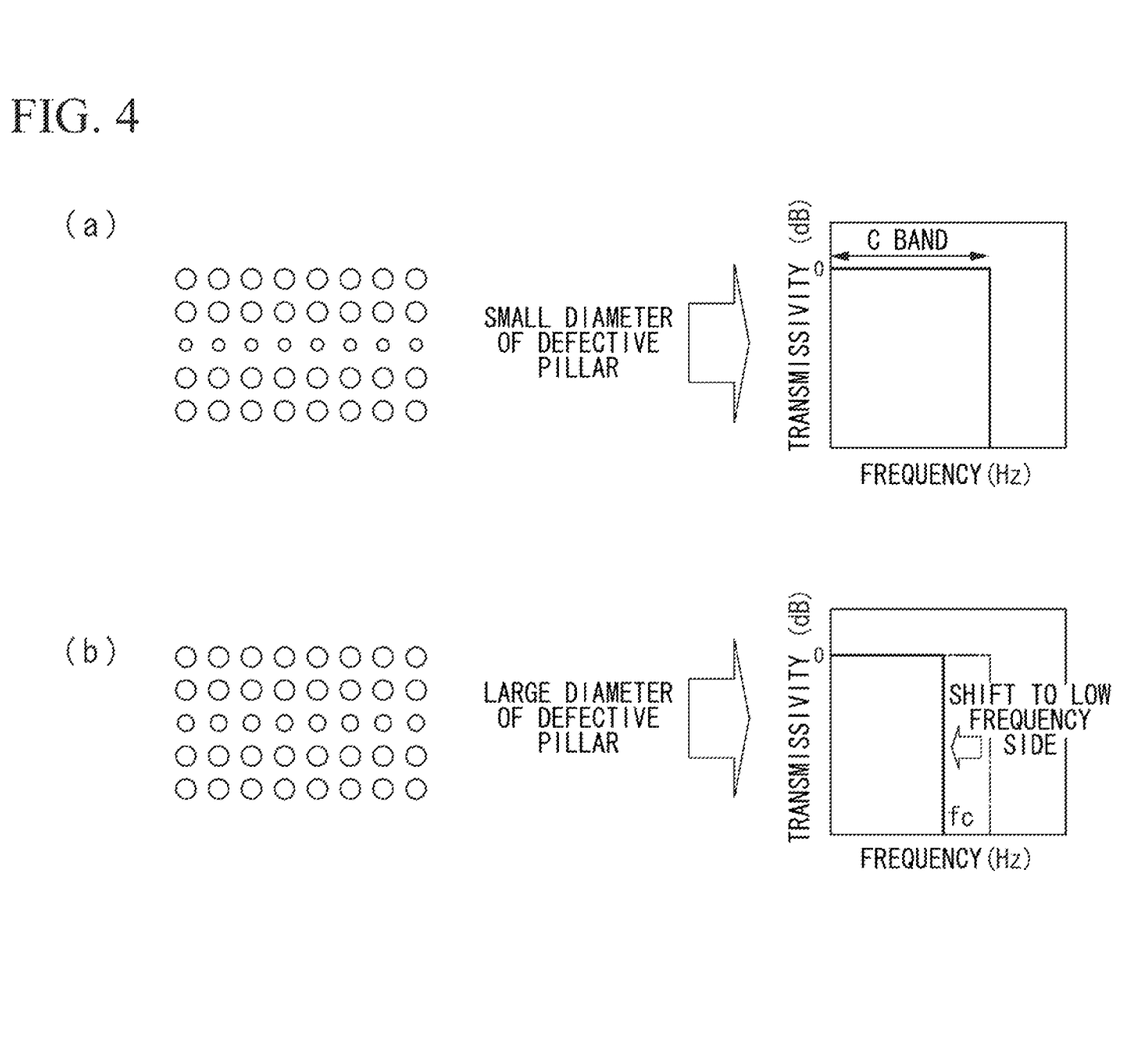
FIG. 4 Illustrations regarding a method of changing the cutoff frequency of a pillar-type photonic crystal waveguide with pillar sectional areas of line-defect cylinders, wherein (a) illustrates a waveguide allowing light to be transmitted in the overall range of a C band, whilst (b) illustrates a waveguide in which a cutoff frequency is set to the middle of the C band.

Photonic crystal waveguides are advantageous in that they can be freely designed in cutoff wavelengths of transmission bands. The design concept for the cutoff frequency (or the cutoff wavelength) in a transmission band of a waveguide composed of a pillar-type photonic crystal will be described with reference to FIG. 4(a), (b). In the case of a C band (whose wavelength ranges from 1,530 to 1,565 nm) serving as an optical communication wavelength range, for example, it is possible to design a waveguide (FIG. 4(a)) transmitting light in the overall range of the C band and another waveguide (FIG. 4(b)) providing a cutoff frequency in the middle of the C band by changing the pillar sectional area of a line-defect cylinder. Therefore, the first waveguide 11 serves as a line-defect waveguide transmitting light in the overall range of the C band, whilst the second waveguide 12 servers as a finite-length line-defect waveguide providing a cutoff frequency fc in the middle of the C band, wherein a low-pass filter is constituted by inserting the second waveguide 12 into the first waveguide 11.

As the method of changing the cutoff frequency (or the cutoff wavelength) of a waveguide, it is possible to adopt various methods other than the foregoing method of changing the sectional area of a line-defect cylinder of a line-defect waveguide. For instance, it is possible to name a method of making grids, on the opposite sides of the alignment of line-defect cylinders, depart from or approach to line-defect cylinders, and a method of increasing or decreasing the pillar sectional area with respect to cylinders proximate to the opposite sides of the center alignment of line-defect cylinders.

As described above, the wavelength filter 1 can be constituted using the first waveguide 11 transmitting light in the overall range of the C band and the second waveguide 12 providing the cutoff frequency in the middle of the C band. That is, the wavelength filter 1 contains the filter unit 10 constituted of the first waveguide 11 with the basic-mode transmission band corresponding to the C band and the second waveguide 12 located in at least one part of the path of the first waveguide 11, wherein the second waveguide 12 serves as a low-pass filter with the cutoff frequency fc (i.e. a finite value included in the C band) providing the basic-mode transmission band. Both the first waveguide 11 and the second waveguide 12 are configured of a single-mode waveguide with an operating band corresponding to a part of or the overall range of the C band (which matches the basic-mode transmission band of the first waveguide 11), wherein the operating band includes the cutoff frequency fc of the second waveguide 12, and wherein the cutoff frequency fc is the cutoff frequency appearing in the high frequency side.

Since Embodiment 1 adopts the second waveguide 12 composed of a pillar-type photonic crystal, the cutoff frequency fc is an upper-limit frequency of a transmission band; hence, the second waveguide 12 serves as a low-pass filter. On the other hand, when the second waveguide 12 is composed of an aperture-type photonic crystal, the cutoff frequency fc is a lower-limit frequency of a transmission band; hence, the second waveguide 12 servers as a high-pass filter. In this constitution, the first waveguide 11 may be composed of an aperture-type photonic crystal as well.

Next, the method how to install the wavelength filter 1 of Embodiment 1 in a photonic crystal will be described.

The photonic crystal is made with a substrate using an SOI wafer (Silicon On Insulator Wafer). The actually used SOI wafer is composed of an embedded oxide film with thickness of 2.0 µm and a silicon active layer with 1.0 µm. Additionally, the silicon active layer is non-doped.

First, a pattern shown in FIG. 1 is rendered using the electron beam exposure technology. When the wavelength of a guided light for use in optical communication is set to 1.55 µm, the lattice constant is set to 0.4 µm, and the diameter of each circular cylinder is set to 0.24 µm. The diameter of the line-defect cylinder 11c is set to 0.16 µm, and the diameter of the line-defect cylinder 12c is set to 0.20 µm.

Next, the silicon active layer is vertically processed according to a resist pattern which is rendered using anisotropic dry etching. Subsequently, the remaining resist pattern is removed using acetone; an ultraviolet curing resin with the same refractive index of 1.45 as the embedded oxide film is applied; then, curing is implemented using ultraviolet ray. Thus, it is possible to manufacture the wavelength filter 1.

Embodiment 2

Next, a wavelength filter 20 according to Embodiment 2 of this invention will be described. Herein, the parts identical to those of Embodiment 1 are designated by the same reference numerals; hence, a description thereof will be omitted.

Figure 5:
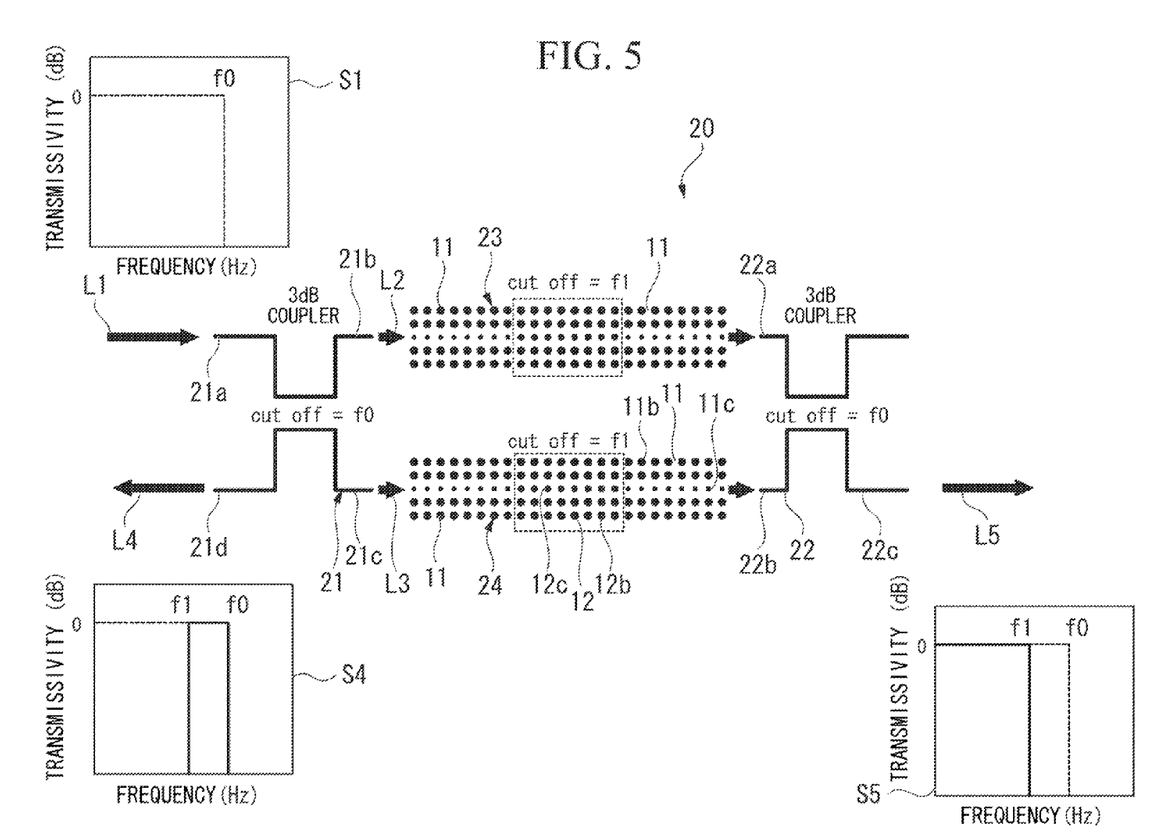
FIG. 5 Illustrations regarding the constitution and operation of a wavelength filter according to Embodiment 2 of this invention, which is constituted of a pair of 3 dB couplers and a filter unit.

As shown in FIG. 5, the wavelength filter 20 of Embodiment 2 is a directional coupler, which is constituted of a pair of 3 dB couplers 21, 22 and two filter units 23, 24 interposed between the 3 dB couplers 21, 22. Both the filter units 23, 24 have the same constitution as the filter unit 10, which is constituted of the first waveguide 11 and the second waveguide 12. A pair of 3 dB couplers 21, 22 constitutes a Mach-Zehnder interferometer, so that the opposite ends of the filter units 23, 24 are connected to the 3 dB couplers 21, 22. FIG. 5 diagrammatically shows that the 3 dB couplers 21, 22 are shaped like linear waveguides, whereas the 3 dB couplers 21, 22 can be configured of photonic crystal waveguides. It is preferable that the 3 dB couplers 21, 22 indicate sufficiently small wavelength dependency in the operating frequency range of the wavelength filter 20.

Next, the operation of the wavelength filter 20 will be described.

Similar to the filter unit 10, both the filter units 23, 24 serve as a low-pass filter with a cutoff frequency f1, wherein f0 denotes an upper-limit cutoff frequency of the 3 dB couplers 21, 22. When an input light L1 with a frequency fi (where fi<f0) is incident on a part 21a of the 3 dB coupler 21, the input light L1 branches into two branch lights L2, L3 while propagating through the 3 db coupler 21. The branch light L2 is supplied to the filter unit 23 via a port 21b, whilst the branch light L3 is supplied to the filter unit 24 via a port 21c.

The wavelength filter 20 performs the following operation according to the high/low relationship between the frequency Li of the input light L1, the upper-limit cutoff frequency f0 of the 3 dB couplers 21, 22, and the cutoff frequency f1 of the filter units 23, 24.

First, in the case where the input light L1 falls within f1<fi<f0, the branch lights L2, L3 are not transmitted through but reflected by the filter units 23, 24 since the frequency fi of the input light L1 is higher than the cutoff frequency f1 of the filter units 23, 24. The reflected branch light L2, L3 returns to the 3 dB coupler 21, wherein if their phases are not varied, they join together as an output light L4, which is transmitted through the 3 dB coupler 21 in a reverse direction and the output via a port 21d.

In the case where the frequency fi of the input light L1 falls within fi<f1, the branch lights L2, L3 are transmitted through the filter units 23, 24 and then supplied to the 3 dB coupler 22 via the ports 22a, 22b since the frequency fi of the input light L1 is lower than the cutoff frequency f1 of the filter units 23, 24. Subsequently, the branch lights L2, L3 propagate through the 3 dB coupler 22, wherein if their phases are not varied, they join together as an output light L5, which is output via a port 22c.

According to the foregoing operation of the wavelength filter 20, when the input light L1 with frequency spectrum S1 is incident on the port 21a of the 3 dB coupler 21, the output light L4 with frequency spectrum S4 is output from the port 21d of the 3 dB coupler 21, whilst the output light L5 with frequency spectrum S5 is output via the port 22c of the 3 dB coupler 22. That is, the wavelength filter 20 serving as the Mach-Zehnder interferometer splits the input light L1 into the high-frequency-side output light L4 and the low-frequency-side output light L5 at the boundary of the cutoff frequency f1.

When the wavelength filter 20 inversely operates, it serves as a multiplexer. In this case, when light with a frequency fia (where f1<fia<f0) is incident on the port 21d of the 3 dB coupler 21 whilst light with a frequency fib (where fib<f1) is simultaneously incident on the port 22c of the 3 dB coupler 22, these lights with the frequencies fia, fib are multiplexed and output from the port 21a of the 3 dB coupler 21.

Embodiment 3

Next, a wavelength filter 30 according to Embodiment 3 of this invention will be described with reference to FIGS. 6 to 11. Herein, parts identical to those of Embodiments 1, 2 are designated by the same reference numerals; hence, a description thereof will be omitted.

Figure 6:
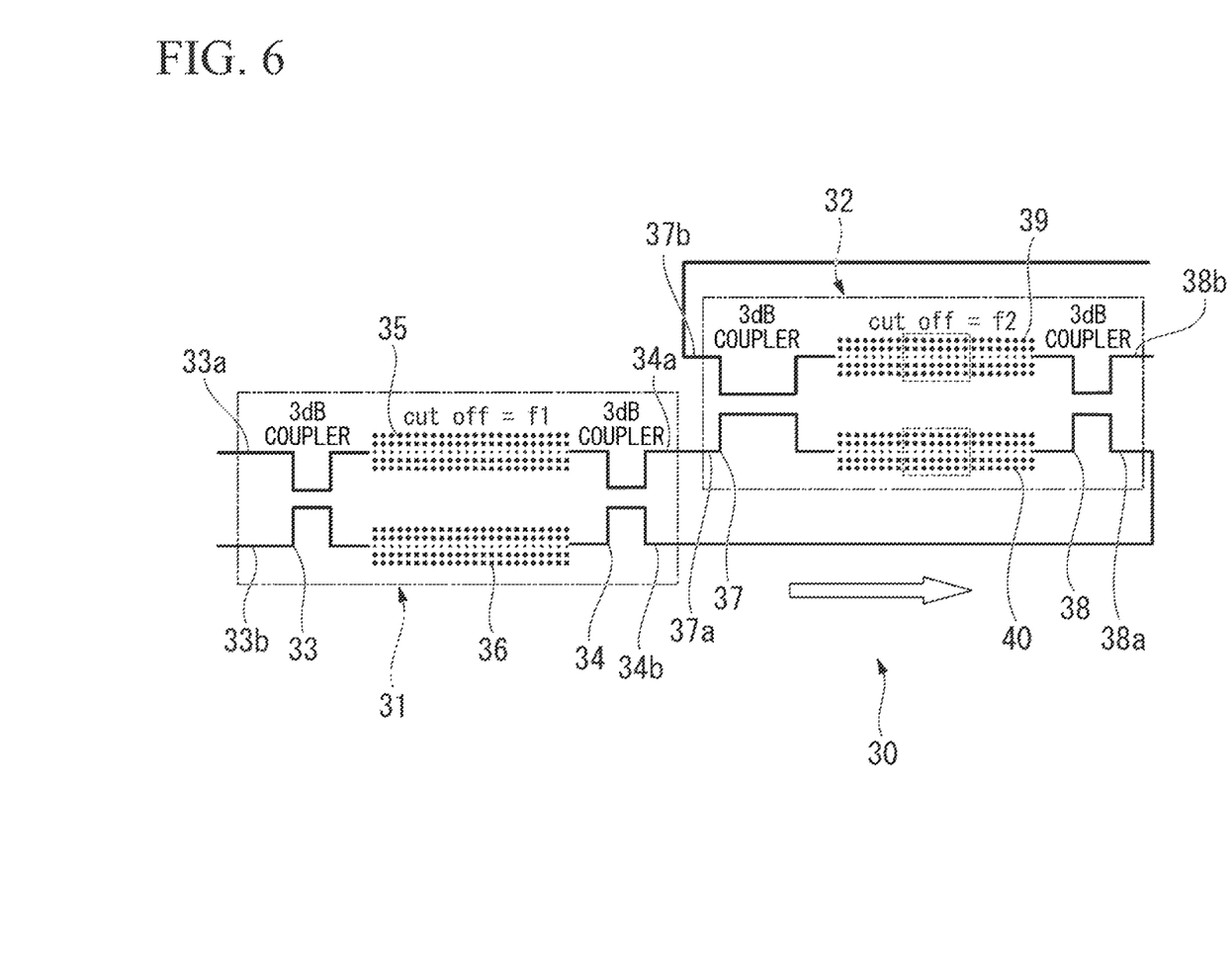
FIG. 6 An illustration regarding the constitution and operation of a wavelength filter according to Embodiment 3 of this invention, which is constituted of a first wavelength filter and a second wavelength filter.

As shown in FIG. 6, the wavelength filter 30 of Embodiment 3 constitutes a Mach-Zehnder interferometer, which is constituted by connecting a first wavelength filter 31 and a second wavelength filter 32. Similar to the wavelength filter 20 of Embodiment 2, the first wavelength filter 31 is constituted of a pair of 3 dB couplers 33, 34 and a pair of filter units 35, 36. Similarly, the second wavelength filter 32 is constituted of a pair of 3 dB couplers 37, 38 and a pair of filter units 39, 40. The wavelength filter 30 serves as a band-pass filter transmitting light with a frequency fi (where f2<fi<f1<f0), the details of which will be described below.

In the wavelength filter 30, the cutoff frequency f1 of the second waveguide embedded in the filter units 35, 36 of the first wavelength filter 31 differs from the cutoff frequency f2 of the second waveguide embedded in the filter units 39, 40 of the second wavelength filter 32 by way of the relationship of f2<f1.

In the first wavelength filter 31, the 3 dB coupler 33 connected to one ends of the filter units 35, 36 is able to input/output light via ports 33a, 33b. Additionally, the 3 dB coupler 34 is connected to the other ends of the filter units 35, 36 such that ports 34a, 34b are respectively connected to ports 37a, 38a of the 3 dB couplers 37, 38 of the second wavelength filter 32.

In the second wavelength filter 32, the port 37a of the 3 dB coupler 37 connected to one ends of the filter units 39, 40 is connected to the port 34a of the 3 dB coupler 34, whilst the port 37b is able to input/output light. On the other hand, the port 38a of the 3 dB coupler 38 connected to the other ends of the filter units 39, 40 of the second wavelength filter 32 is connected to the port 34b of the 3 dB coupler 34, whilst the port 38b is able to input/output light.

All the 3 dB couplers 33, 34 and 38 are configured with the center symmetry, wherein the lengths of the parallel waveguides constituting the 3 dB couplers 33, 34 and 38 are determined such that light is output to the waveguide disposed at the position (i.e. the point-symmetry position) on the diagonal line relative to the input waveguide. The length of the parallel waveguide constituting the 3 dB coupler 37 is determined such that light is not output to the waveguide disposed at the position on the diagonal line relative to the input waveguide, but light is output to the waveguide disposed at the position with the plane symmetry relative to a plane vertically crossing the input waveguide at its center.

Next, the outline of the operation of the wavelength filter 30 will be described.

Figure 7:
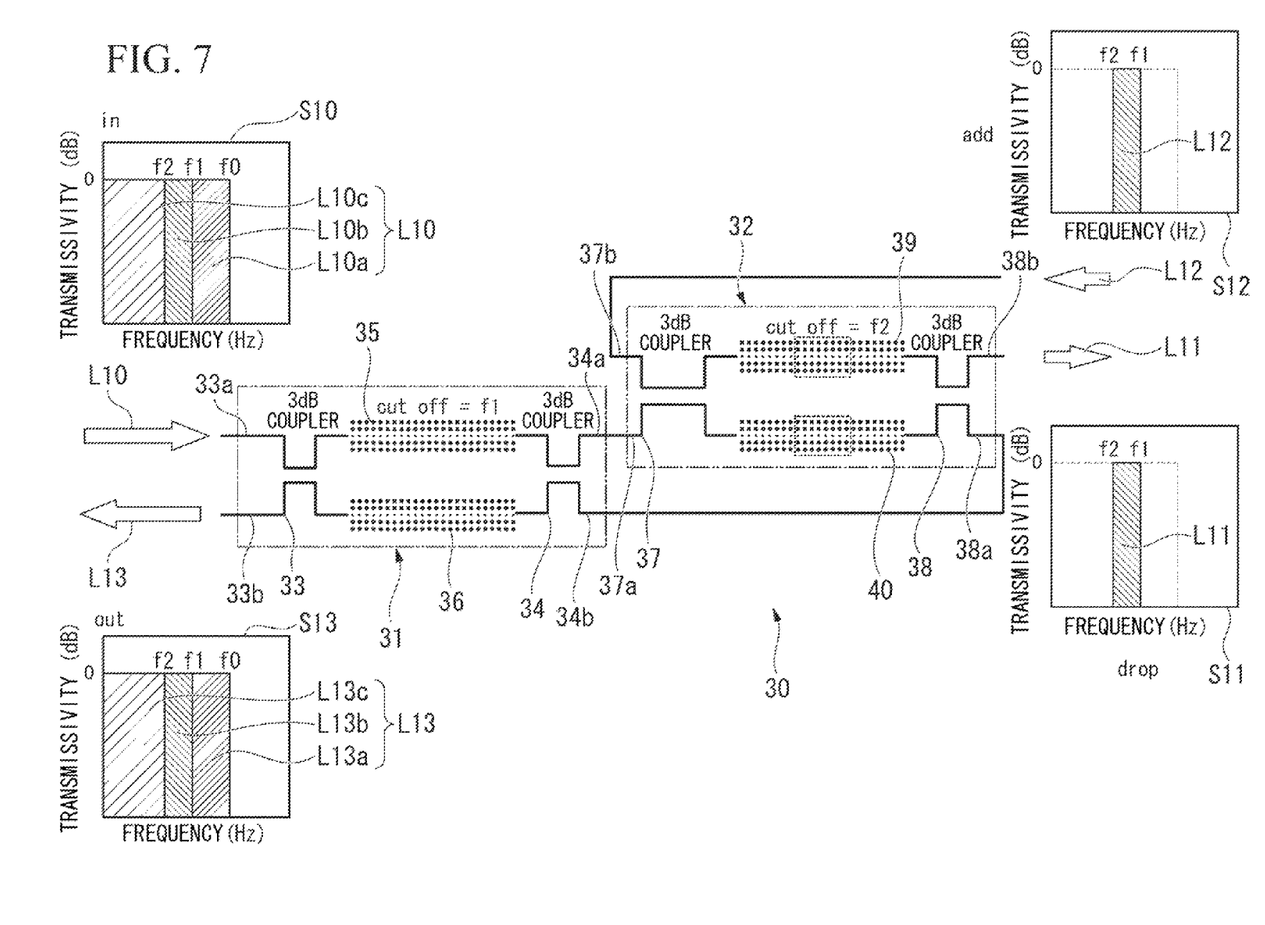
FIG. 7 Illustrations regarding transmission paths and frequency spectrum of input lights L10, L12 and output lights L11, L13 in the wavelength filter according to Embodiment 3.

FIG. 7 shows transmission characteristic of the wavelength filter 30. Herein, a first input light L10 indicates frequency spectrum S10 and includes a plurality of lights L10a, L10b, L10c with different wavelengths. When the first input light L10 is incident on the port 33a of the 3 dB coupler 33, the light L10b with a frequency fi where f2<fi<f1 is transmitted from the first wavelength filter 31 to the second wavelength filter 32, so that an output light L11 with frequency spectrum S11 is output via the port 38b of the 3 dB coupler 38. In the input light L10, the light L10a with a frequency fi where f1<fi<f0 is reflected by the first wavelength filter 31, so that the reflected light is output as lights L13a, L13c via the port 33b of the 3 dB coupler 33. The light L10c with a frequency fi where fi<f2 are transmitted through the first wavelength filter 31 and the second wavelength filter 32 in turn, then retransmitted through the first wavelength filter 31, so that the retransmitted light is output as the light L13c via the port 33b of the 3 dB coupler 33.

Additionally, a second input light L12 with a frequency fi where f2<fi<f1 and frequency spectrum S12 is incident on the port 38b of the 3 dB coupler 38 of the second wavelength filter 32. The second input light L12 is transmitted through the second wavelength filter 32 and the first wavelength filter 31 in turn; subsequently, the transmitted light is output as a light L13b via the port 33b of the 3 dB coupler 33. That is, the lights L13a, L13c corresponding to the lights L10a, L10c and the light L13b corresponding to the second input light L12 are multiplexed together as an output light L13, which is output via the port 33b of the 3 dB coupler 33 of the first wavelength filter 31. The output light L13 indicates frequency spectrum S13, which is a combination of frequency spectrums of the lights L10a, L10c and frequency spectrum of the second input light L12.

As described above, the wavelength filter 13 serves as an optical add/drop filter.

Next, the operation of the wavelength filter 30 will be described in detail with reference to FIGS. 8 to 11.

Figure 8:
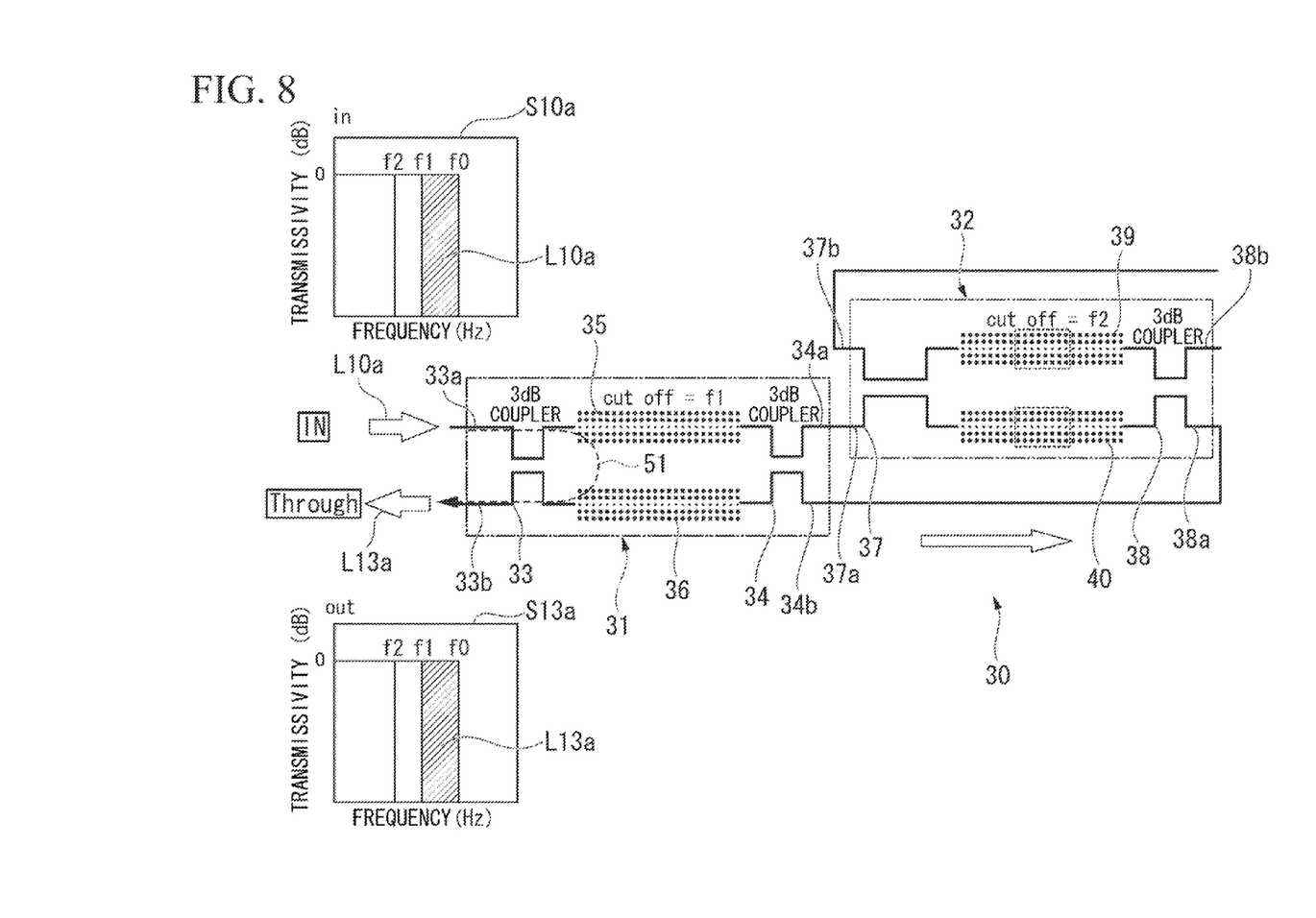
FIG. 8 Illustrations regarding transmission paths and frequency spectrum established when light L10a constituting input light L10 is incident on the wavelength filter according to Embodiment 3.

When the light L10a with the frequency fi where f1<fi<f0 and frequency spectrum S10a is incident on the port 33b of the 3 dB coupler 33, the light L10a is transmitted through the first wavelength filter 31 via a transmission path 51 denoted by a dotted line in FIG. 8. FIG. 8 diagrammatically shows that the light L10a is incident on the port 33a of the 3 dB coupler 33 and then output as the light L13a via the port 33b, whereas in actuality, the light L10a is transmitted through the 3 dB coupler 33 and then split into two branch lights, which are supplied to the filter units 35, 36. Subsequently, the branch lights of the light L10a are reflected by the filter units 35, 36, so that the light L13a with frequency spectrum S13a is output via the port 33b of the 3 dB coupler 33.

Figure 9:
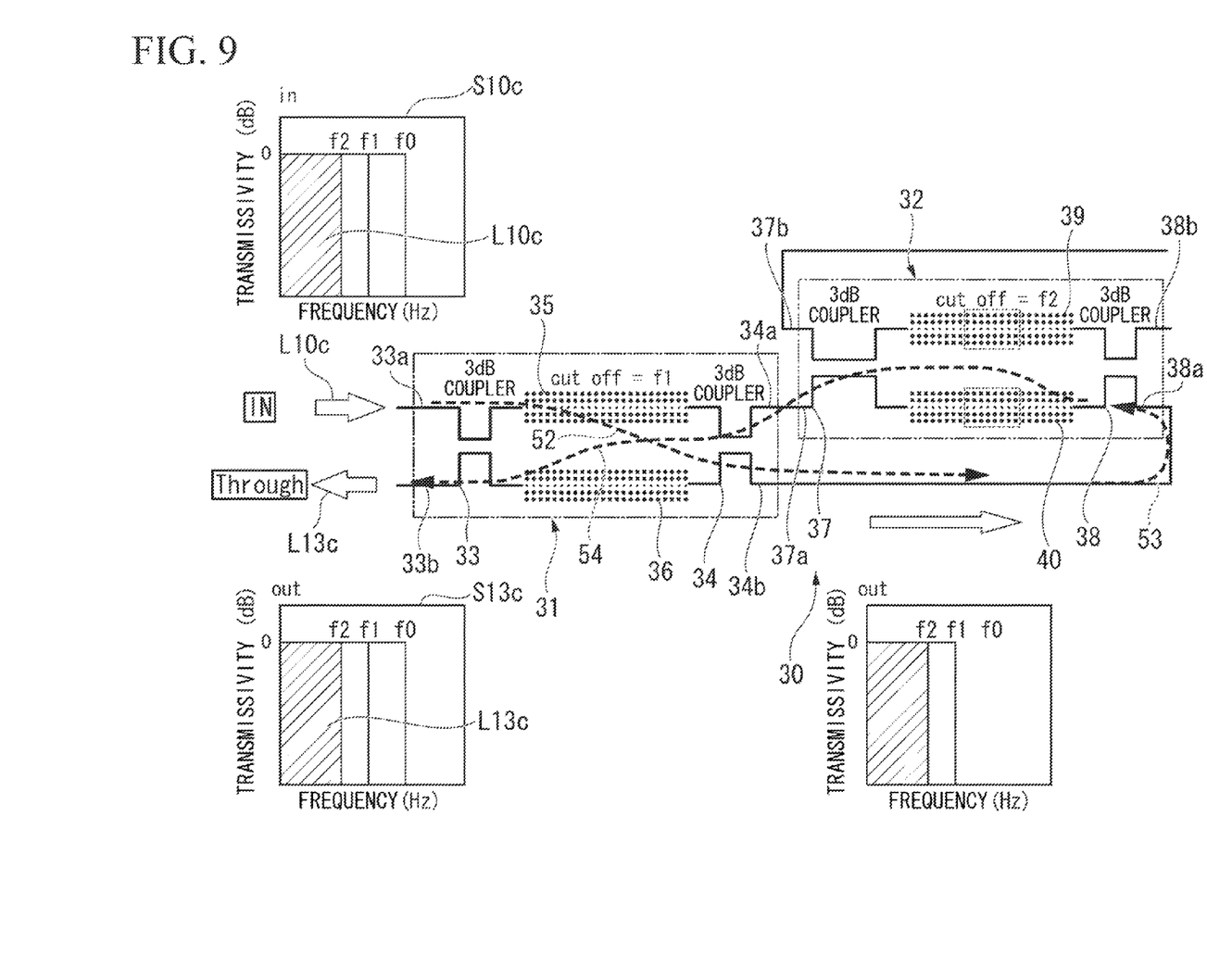
FIG. 9 Illustrations regarding transmission paths and frequency spectrum established when light L10c constituting input light L10 is incident on the wavelength filter according to Embodiment 3.

When the light L10c with the frequency fi where fi<f2 and frequency spectrum S10c is incident on the port 33a of the 3 dB coupler 33, the light L10c is transmitted through the first wavelength filter 31 and the second wavelength filter 32 via transmission paths 52, 53, 54 denoted by dotted lines in FIG. 9. FIG. 9 diagrammatically shows that the light L10c is incident on the port 33a of the 3 dB coupler 33 of the first wavelength filter 31 and then output as the light L13c via the port 33b, whereas in actuality, the light L10c is transmitted through the 3 dB coupler 33 and then split into two lights, which are supplied to the filter units 35, 36. The transmitted light is output via the port 34b of the 3 dB coupler 34 and then transmitted toward the port 38a of the 3 dB coupler 38. The input light of the 3 dB coupler 38 is split into two lights, which are transmitted through the filter units 39, 40 of the second wavelength filter 32, which are output from the port 37a of the 3 dB coupler 37, and then which are input into the port 34a of the 3 dB coupler 34 of the first wavelength filter 31. The transmitted light of the 3 dB coupler 34 is split into two lights, which are transmitted through the filter units 35, 36 of the first wavelength filter 31, so that the light L13c with frequency spectrum S13c is output via the port 33b of the 3 dB coupler 33.

Figure 10:
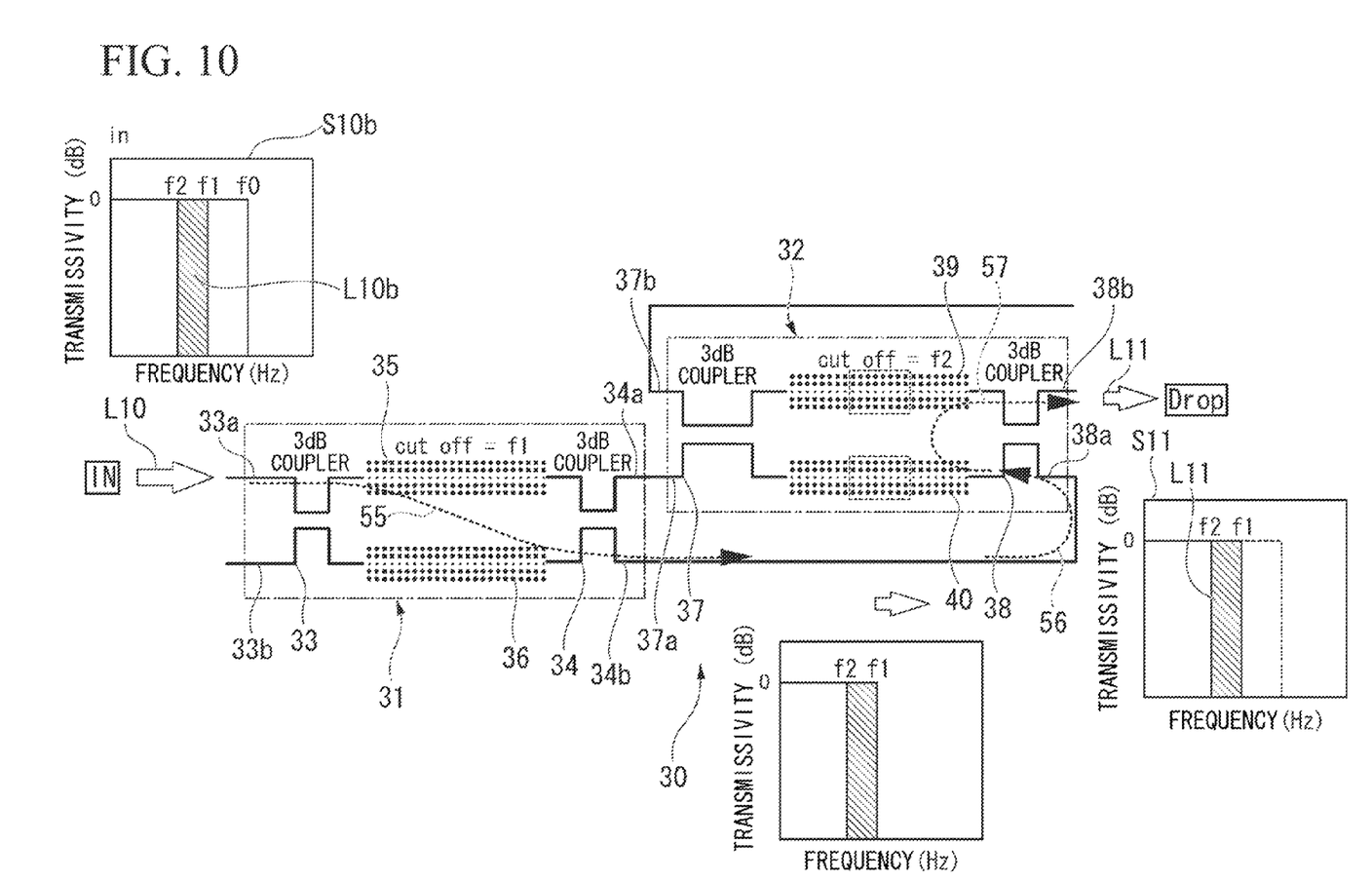
FIG. 10 Illustrations regarding transmission paths and frequency spectrum established when light L10b constituting input light L10 is incident on the wavelength filter according to Embodiment 3.

When the light L10b with the frequency fi where f2<fi<f1 and frequency spectrum S10b is incident on the port 33a of the 3 dB coupler 33, the light L10b is transmitted through the first wavelength filter 31 and the second wavelength filter 32 via transmission paths 55, 56, 57 denoted by dotted lines in FIG. 10. FIG. 10 diagrammatically shows that the light L10b is incident on the port 33a of the 3 dB coupler 33 of the first wavelength filter 31 and then output as the output light L11 via the port 38b of the 3 dB coupler 38 of the second wavelength filter 32. Specifically, the light L10b is transmitted through the 3 dB couplers 33, 34 of the first wavelength filter 31 and then input into the port 38a of the 3 dB coupler 38. The input light of the 3 dB coupler 38 is split into two lights, which are reflected by the filter units 39, 40 so that the output light S11 with frequency spectrum S11 is output via the port 38b.

Figure 11:
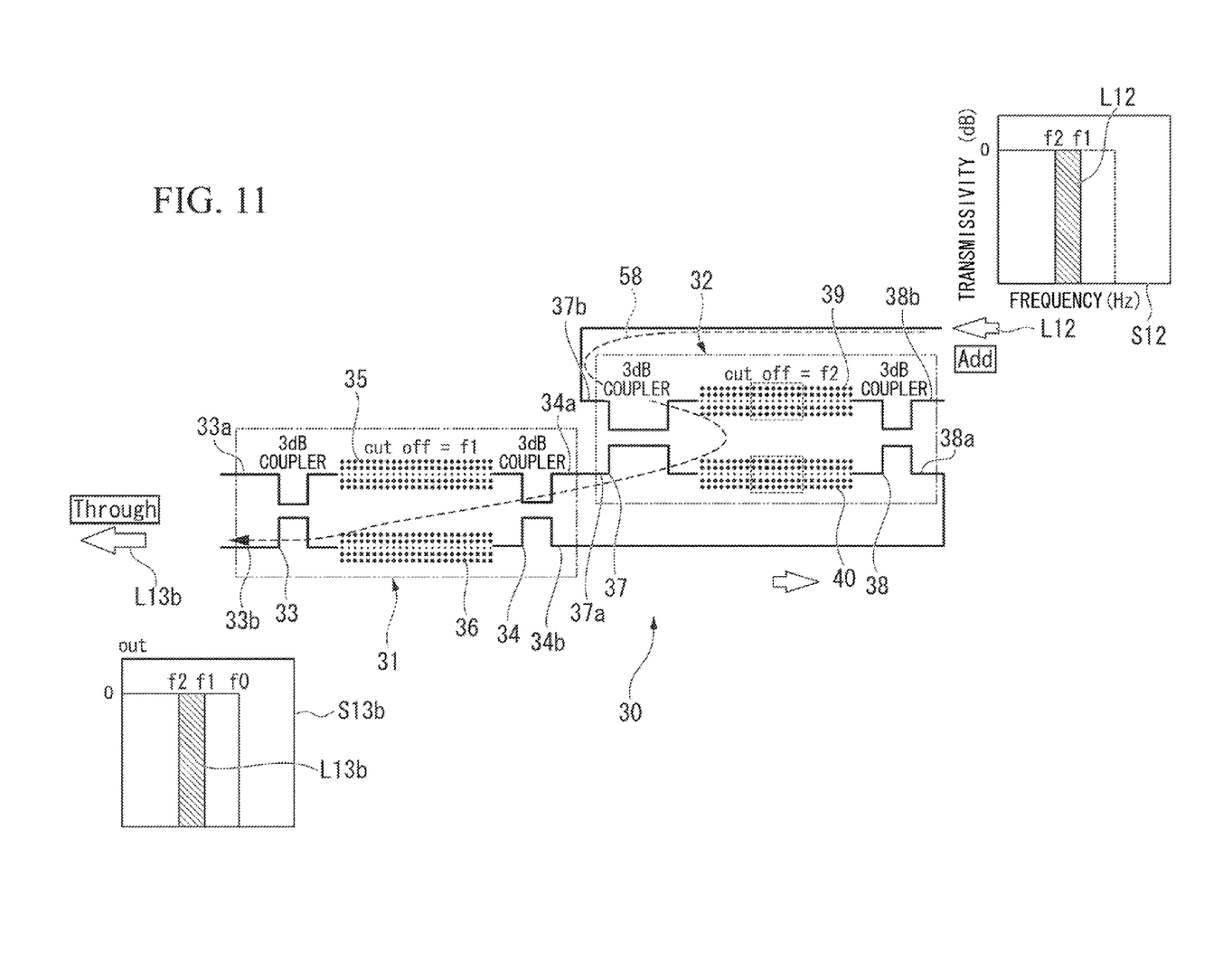
FIG. 11 Illustrations regarding transmission paths and frequency spectrum established when input light L12 is incident on the wavelength filter according to Embodiment 3.

When the input light L12 with the frequency fi where f2<fi<f1 and frequency spectrum S12 is incident on the port 38b of the 3 dB coupler 38, the input light L12 is transmitted through the second wavelength filter 32 and the first wavelength filter 31 in turn via a transmission path 58 denoted by a dotted line in FIG. 11. FIG. 11 diagrammatically shows that the input light L12 is incident on the port 38 of the 3 dB coupler 38 of the second wavelength filter 38 and then output as the output light L13b via the port 33b of the 3 dB coupler 33 of the first wavelength filter 31. Specifically, the input light L12 is transmitted towards the port 37b of the 3 dB coupler 37 of the second wavelength filter 32, subsequently transmitted through the 3 dB coupler 37 and the split into two lights, which are supplied to the filter units 39, 40. The transmitted light is reflected by the filter units 39, 40 and then output via the port 37a of the 3 dB coupler 37. Thereafter, the transmitted light is supplied to the port 34a of the 3 dB coupler 34 of the first wavelength filter 31, transmitted through the filter units 39, 40, and then output as the light L13b via the port 33b of the 3 dB coupler 33.

As described above, the wavelength filter 30 of Embodiment 3 serves as a broadband wavelength (i.e. an add/drop filter) without using a narrowband resonator. Since the cutoff frequencies f1, f2 correspond to the cutoff frequencies of the second waveguides included in the filter units 35, 36 of the first wavelength filter 31 and the filter units 39, 40 of the second wavelength filter 32, it is possible to easily design the wavelength filter without changing the overall circuit area. That is, the wavelength filter 30 differs from the resonance-type wavelength filter in that an add/drop operation can be easily implemented with respect to light of a specific frequency band.

Heretofore, various wavelength filters according to the foregoing embodiments using photonic crystals have been described, but this invention is not necessarily limited to these embodiments. For instance, it is possible to modify circular cylinders other than line-defect cylinders constituting photonic crystals, or to increase/decrease their sectional areas. Cylindrical shapes are not necessarily limited to circular cylindrical shapes; hence, it is possible to adopt other shapes such as quadratic prisms and octagonal prisms.

This invention is not necessarily limited to the foregoing embodiments, which are illustrative and not restrictive; hence the foregoing embodiments can be further modified within the scope of the invention as defined by the appended claims.

INDUSTRIAL APPLICABILITY

This invention provides a wavelength filter, having a simple and small structure, which is able to achieve broadband optical transmission/reflection property; hence, this invention is applicable to various types of optical integrated circuits and optical communication technologies.

DESCRIPTION OF THE REFERENCE NUMERALS

1 Wavelength filter (Embodiment 1)
10 Filter unit
11 First waveguide
12 Second waveguide
20 Wavelength filter (Embodiment 2)
21 3 dB coupler
22 3 dB coupler 30 Wavelength filter (Embodiment 3)
31 First wavelength filter
32 Second wavelength filter

The invention claimed is:

1. A wavelength filter comprising:
a first waveguide with a transmission band of a predetermined basic mode; and
a second waveguide, which is arranged in at least one location of the first waveguide, with a transmission band whose cutoff frequency corresponds to a finite value included in the transmission band of the basic mode of the first waveguide,
wherein both the first waveguide and the second waveguide are configured of a single- mode waveguide including a pillar-type tetragonal photonic crystal, and
wherein an operating band corresponds to a part of or the overall range of the transmission band of the basic mode of the first waveguide and includes the cutoff frequency of the second waveguide.

2. The wavelength filter according to claim 1 further comprising a pair of optical couplers connected to opposite ends of a filter unit including the first waveguide and the second waveguide.

3. The wavelength filter according to claim 2, wherein the pair of optical couplers constitute a Mach-Zehnder interferometer.

4. The wavelength filter according to claim 3, wherein the pair of optical couplers is configured of a photonic crystal waveguide.

5. The wavelength filter according to claim 4, wherein the pair of optical couplers is configured of a pillar-type photonic crystal waveguide.

6. A wavelength filter connecting a first wavelength filter and a second wavelength filter together, wherein the first wavelength filter and the second wavelength filter are each constituted of a filter unit, which includes a first waveguide with a transmission band of a predetermined basic mode and a second waveguide, arranged in at least one location of the first waveguide, with a transmission band whose cutoff frequency corresponds to a finite value included in the transmission band of the basic mode of the first waveguide, in which both the first waveguide and the second waveguide are configured of a single-mode waveguide including a pillar-type photonic crystal, and in which an operating band corresponds to a part of or the overall range of the transmission band of the basic mode of the first waveguide and includes the cutoff frequency of the second waveguide, and a pair of optical couplers which is connected to opposite ends of the filter unit and which constitutes a Mach-Zehnder interferometer, and wherein the cutoff frequency of the second waveguide of the first wavelength filter differs from the cutoff frequency of the second waveguide of the second wavelength filter.

* * * * *